United States Patent
Kobayashi et al.

(10) Patent No.: US 12,222,588 B2
(45) Date of Patent: Feb. 11, 2025

(54) NANOGRANULAR STRUCTURE MATERIAL AND METHOD FOR PRODUCING SAME

(71) Applicant: RESEARCH INSTITUTE FOR ELECTROMAGNETIC MATERIALS, Tomiya (JP)

(72) Inventors: Nobukiyo Kobayashi, Tomiya (JP); Tadayoshi Iwasa, Tomiya (JP); Kenji Ikeda, Tomiya (JP); Kenichi Arai, Tomiya (JP)

(73) Assignee: Research Institute for Electromagnetic Materials, Miyagi (JP)

( * ) Notice: Subject to any disclaimer, the term of this patent is extended or adjusted under 35 U.S.C. 154(b) by 0 days.

(21) Appl. No.: 18/019,914

(22) PCT Filed: Mar. 1, 2022

(86) PCT No.: PCT/JP2022/008503
§ 371 (c)(1),
(2) Date: Feb. 6, 2023

(87) PCT Pub. No.: WO2022/186177
PCT Pub. Date: Sep. 9, 2022

(65) Prior Publication Data
US 2023/0230733 A1 Jul. 20, 2023

(30) Foreign Application Priority Data
Mar. 5, 2021 (JP) .................. 2021-035401

(51) Int. Cl.
G02F 1/00 (2006.01)
H01F 1/00 (2006.01)
H01F 10/20 (2006.01)

(52) U.S. Cl.
CPC ......... G02F 1/0036 (2013.01); H01F 1/0063 (2013.01); H01F 10/20 (2013.01)

(58) Field of Classification Search
CPC ....... H01F 10/20; H01F 1/0063; G02F 1/0036
See application file for complete search history.

(56) References Cited

U.S. PATENT DOCUMENTS

| | | | |
|---|---|---|---|
| 9,494,809 B2 | 11/2016 | Yamada et al. | |
| 10,513,760 B2 | 12/2019 | Suetsuna et al. | |
| 2006/0228589 A1 | 10/2006 | Choi et al. | |
| 2010/0294978 A1 | 11/2010 | Nagata et al. | |
| 2012/0052286 A1 | 3/2012 | Norwood et al. | |
| 2022/0146600 A1 | 5/2022 | Miyamoto et al. | |

FOREIGN PATENT DOCUMENTS

| | | | |
|---|---|---|---|
| JP | H10-308320 A | 11/1998 | |
| JP | H11-183859 A | 7/1999 | |
| JP | 2001-027222 A | 1/2001 | |
| JP | 2001-094175 A | 4/2001 | |
| JP | 2008-205020 A | 9/2008 | |
| JP | 2010-272652 A | 12/2010 | |
| JP | 2011-510328 A | 3/2011 | |
| JP | 2016-060956 A | 4/2016 | |
| JP | 2017-098423 A | 6/2017 | |
| JP | 2018-028499 A | 2/2018 | |
| JP | 2019-165106 | * 9/2019 | |
| JP | 6619216 B2 | 12/2019 | |
| JP | 2020-126006 A | 8/2020 | |
| WO | 2004/061876 A1 | 7/2004 | |

OTHER PUBLICATIONS

English language Written Opinion for PCT/JP2022/008503, May 26, 2022 (Year: 2022).*
Translation for JP 2008-205020, Sep. 4, 2008.*
Translation for JP JP 2017-098423 (JP 6619216), Jun. 1, 2017.*
Office Action/Search Report dated Jul. 12, 2024 issued in the corresponding German Patent Application No. 112022000090.2 with the English machine translation thereof.

* cited by examiner

Primary Examiner — C Melissa Koslow
(74) Attorney, Agent, or Firm — Carrier, Shende & Associates P.C.; Fulchand P. Shende; Joseph P. Carrier

(57) ABSTRACT

An object of the present invention is to provide a new nanogranular structure material having magneto-optical properties different from those of existing nanogranular structure materials, and a method for producing the same. The nanogranular structure material has a composition represented by L-M-F—O wherein L is at least one element selected from the group consisting of Fe, Co, and Ni, and M is at least one element selected from the group consisting of Li, Be, Mg, Al, Si, Ca, Sr, Ba, Bi, and rare earth elements, F is fluorine, and O is oxygen. The nanogranular structure material according to the present invention is composed of a matrix formed of a fluorine compound having a composition represented by M-F and metal oxide nanoparticles dispersed in the matrix and having a composition represented by L-O.

7 Claims, 5 Drawing Sheets

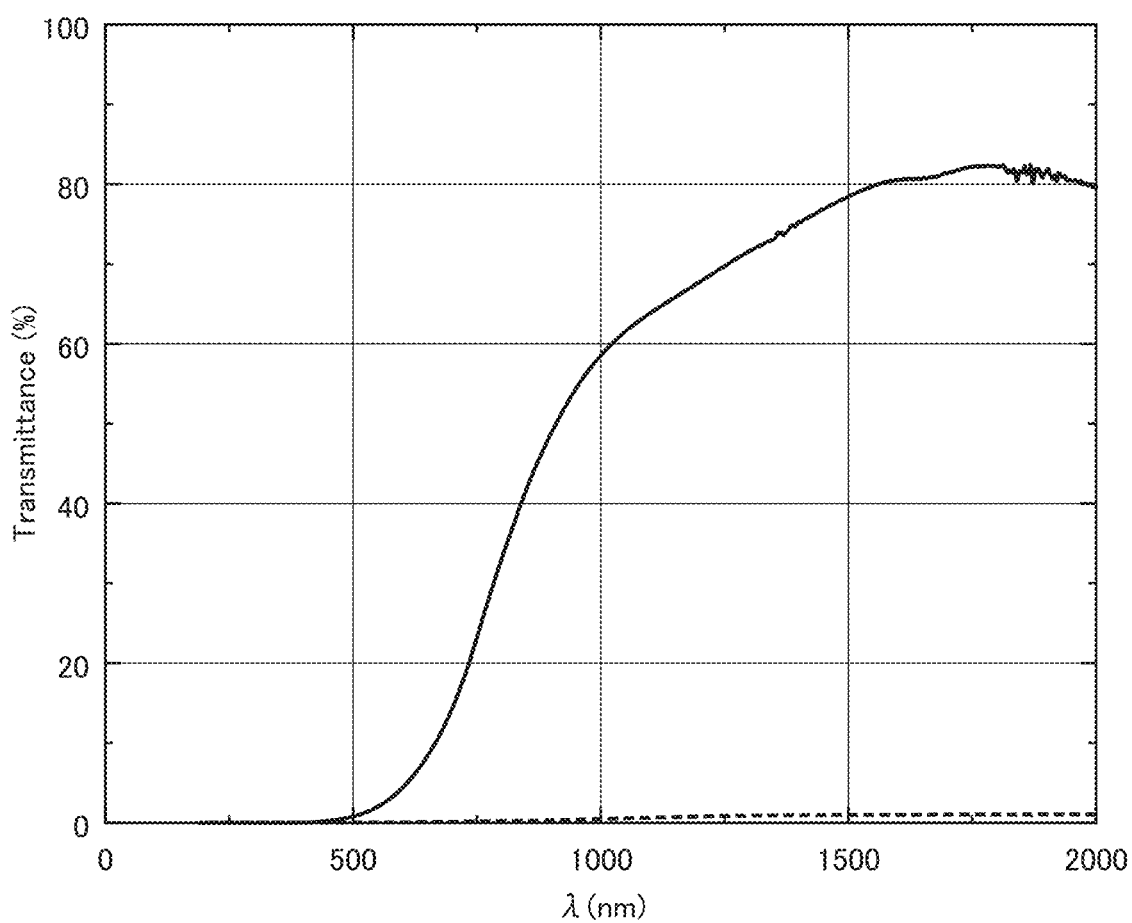

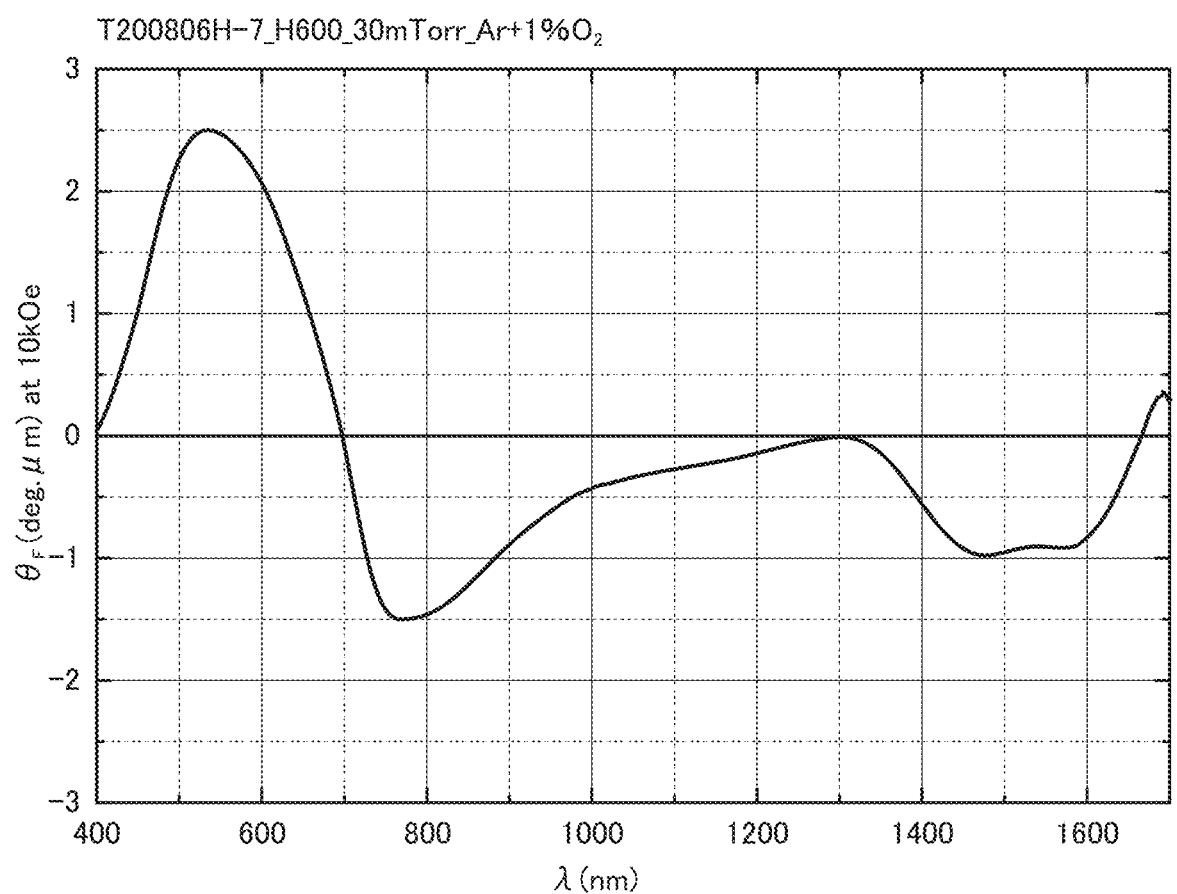

NANOGRANULAR STRUCTURE MATERIAL AND METHOD FOR PRODUCING SAME

TECHNICAL FIELD

The present invention relates to a nanogranular structure material and a method for producing the same.

BACKGROUND ART

The applicant of the present application has proposed a magnetic thin film having a nanogranular structure in which nanometer-sized metal particles are dispersed in an insulator matrix (refer to Patent Literature 1).

CITATION LIST

Patent Literature

Patent Literature 1: Japanese Patent No. 6619216

SUMMARY OF INVENTION

Technical Problem

An object of the present invention is to provide a new nanogranular structure material having magneto-optical properties different from those of existing nanogranular structure materials, and a method for producing the same.

Solution to Problem

The nanogranular structure material of the present invention comprises:

a matrix formed of a fluorine compound having a composition represented by M-F; and metal oxide nanoparticles dispersed in the matrix and having a composition represented by L-O, the nanogranular structure material having a composition represented by L-M-F—O, wherein L is at least one element selected from the group consisting of Fe, Co, and Ni, M is at least one element selected from the group consisting of Li, Be, Mg, Al, Si, Ca, Sr, Ba, Bi, and rare earth elements, F is fluorine, O is oxygen, and the atomic ratio of L is within the range of 0.03 to 0.50, the atomic ratio of M is within the range of 0.03 to 0.30, the atomic ratio of F is within the range of 0.06 to 0.65, and the atomic ratio of O is within the range of 0.04 to 0.50.

A method for producing the nanogranular structure material of the present invention comprises a step of heat-treating, in a temperature range of 300 to 800° C. in an oxygen-containing atmosphere, a primary nanogranular structure material composed of a matrix having a composition represented by M-F and metal nanoparticles dispersed in the matrix and having a composition represented by L to provide the nanogranular structure material as a secondary nanogranular structure material.

BRIEF DESCRIPTION OF THE DRAWINGS

FIG. 4 shows an illustrative view of the wavelength dependence of the light transmittance of each sample of the nanogranular structure material.

FIG. 5 shows an illustrative view of the wavelength dependence of the Faraday rotation angle of the nanogranular structure material of Example.

DESCRIPTION OF EMBODIMENTS (Configuration of Nanogranular Structure Material)

Figure 1:
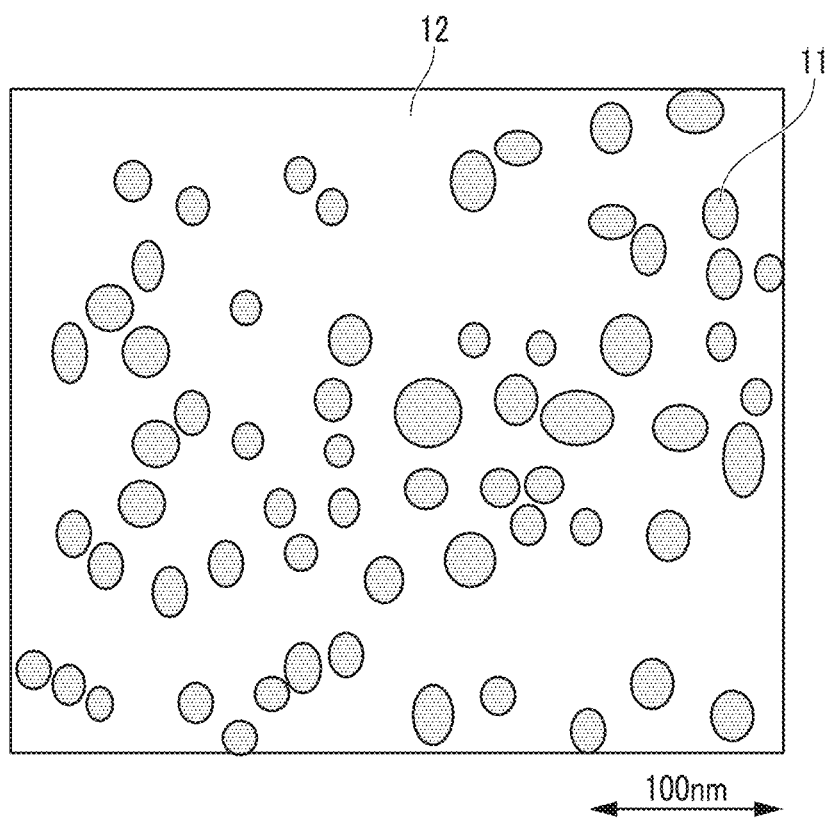
FIG. 1 shows a schematic illustrative view of a nanogranular structure material as one embodiment of the present invention.

A nanogranular structure material (secondary nanogranular structure material) as one embodiment of the present invention schematically shown in FIG. 1 is a nanogranular structure material in which metal oxide nanoparticles 11 are dispersed in a matrix 12 consisting of a fluorine compound. For example, a nanogranular structure material has a composition represented by L-M-F—O, where L is one or more elements selected from Fe, Co, and Ni, M is at least one or more elements selected from Li, Be, Mg, Al, Si, Ca, Sr, Ba, Bi, and rare earth elements, F is fluorine, and O is oxygen.

The atomic ratio of L is within the range of 0.03 to 0.50, the atomic ratio of M is within the range of 0.03 to 0.30, the atomic ratio of F is within the range of 0.06 to 0.65, and the atomic ratio of O is within the range of 0.04 to 0.50. The total atomic ratio of L and O is within the range of 0.07 to 0.88. The total atomic ratio of M and F is within the range of 0.12 to 0.93. The metal oxide nanoparticles 11 have a composition mainly represented by L-O. The matrix 12 consists mainly of a fluorine compound having a composition represented by M-F. The total atomic ratio of L, M, F, and O amounts to one.

The light transmittance of the nanogranular structure material for light in the wavelength region of 1000 to 1675 nm is within the range of 40% or more at an optical path length of 1 μm.

The Faraday rotation angle of the nanogranular structure material for light in the wavelength region of 500 to 680 and 720 to 1000 nm in the visible light region is within 0.1 deg/μm or more as an absolute value.

The Faraday rotation angle of the nanogranular structure material for light in the wavelength region of 1350 to 1650 nm, which is the optical communication wavelength band, is within 0.1 deg/μm as absolute value.

(Method for Producing Nanogranular Structure Material)

A method for producing a nanogranular structure material having the configuration shown in FIG. 1 will be described. First, a primary nanogranular structure material is produced (STEP 1). The primary nanogranular structure material is produced by, for example, a sputtering method or an RF sputtering method (for example, refer to Patent Literature 1). Sputtering is performed by using a composite target in which chips of a fluorine compound are evenly arranged on a disk of a magnetic metal or the alloy thereof, or using a target of a magnetic metal or the alloy thereof simultaneously with a target consisting of a fluorine compound. Ar gas is used for sputtering deposition. The film thickness of the nanogranular structure material is controlled by adjusting the deposition time, and the film is formed to a thickness of, for example, approximately 0.3 to 5 m. A substrate is indirectly water cooled or maintained at any temperature within the temperature range of 100 to 800° C. The sputtering pressure during deposition is controlled to be within the range of 1 to 60 mTorr. Sputtering power is controlled to be within the range of 50 to 350 W.

This produces a primary nanogranular structure material in which magnetic metal nanoparticles are dispersed in a matrix formed of a fluorine compound. For example, a primary nanogranular structure material has a composition represented by L-M-F, where L is one or more elements selected from Fe, Co, and Ni, M is at least one or more elements selected from Li, Be, Mg, Al, Si, Ca, Sr, Ba, Bi, and rare earth elements, and F is fluorine. The atomic ratio of M is within the range of 0.01 to 0.40, the atomic ratio of F is within the range of 0.02 to 0.70, and the total atomic ratio of M and F is within the range of 0.03 to 0.97. The primary nanogranular structure material has a nanogranular structure in which metal nanoparticles having the composition represented by L are uniformly distributed in a matrix formed of a fluoride having a composition represented by M-F.

The particle size of the metal nanoparticles is, for example, within the range of 1 to 50 nm or within the range of 1 to 20 nm. The particle size distribution of the metal nanoparticles (and thus the particle size distribution of the metal oxide nanoparticles 11 in the secondary nanogranular structure material) can be adjusted by changing the deposition conditions and/or the deposition composition.

The primary nanogranular structure material is heat-treated in an oxygen-containing atmosphere at a temperature range of 300 to 800° C. to produce a secondary nanogranular structure material (STEP 2).

Example and Comparative Examples (Sample 1 (Comparative Example 1))

In Sample 1, Fe and Co were selected as L, Ba was selected as M, and a primary nanogranular structure material represented by $Fe_{44}Co_{32}Ba_{13}F_{11}$ was produced as sample 1. The sample 1 is produced by, for example, a sputtering method or an RF sputtering method (for example, refer to Patent Literature 1). Sputtering is performed by using a composite target in which chips of a fluorine compound are evenly arranged on a disk of a magnetic metal or the alloy thereof, or using a target of a magnetic metal or the alloy thereof simultaneously with a target consisting of a fluorine compound. Ar gas is used for sputtering deposition. The film thickness of the nanogranular structure material is controlled by adjusting the deposition time, and the film is formed to a thickness of, for example, approximately 0.3 to 5 μm. A substrate is indirectly water cooled or maintained at any temperature within the temperature range of 100 to 800° C. The sputtering pressure during deposition is controlled to be within the range of 1 to 60 mTorr. Sputtering power is controlled to be within the range of 50 to 350 W.

(Sample 2 (Comparative Example 2))

Figure 2:
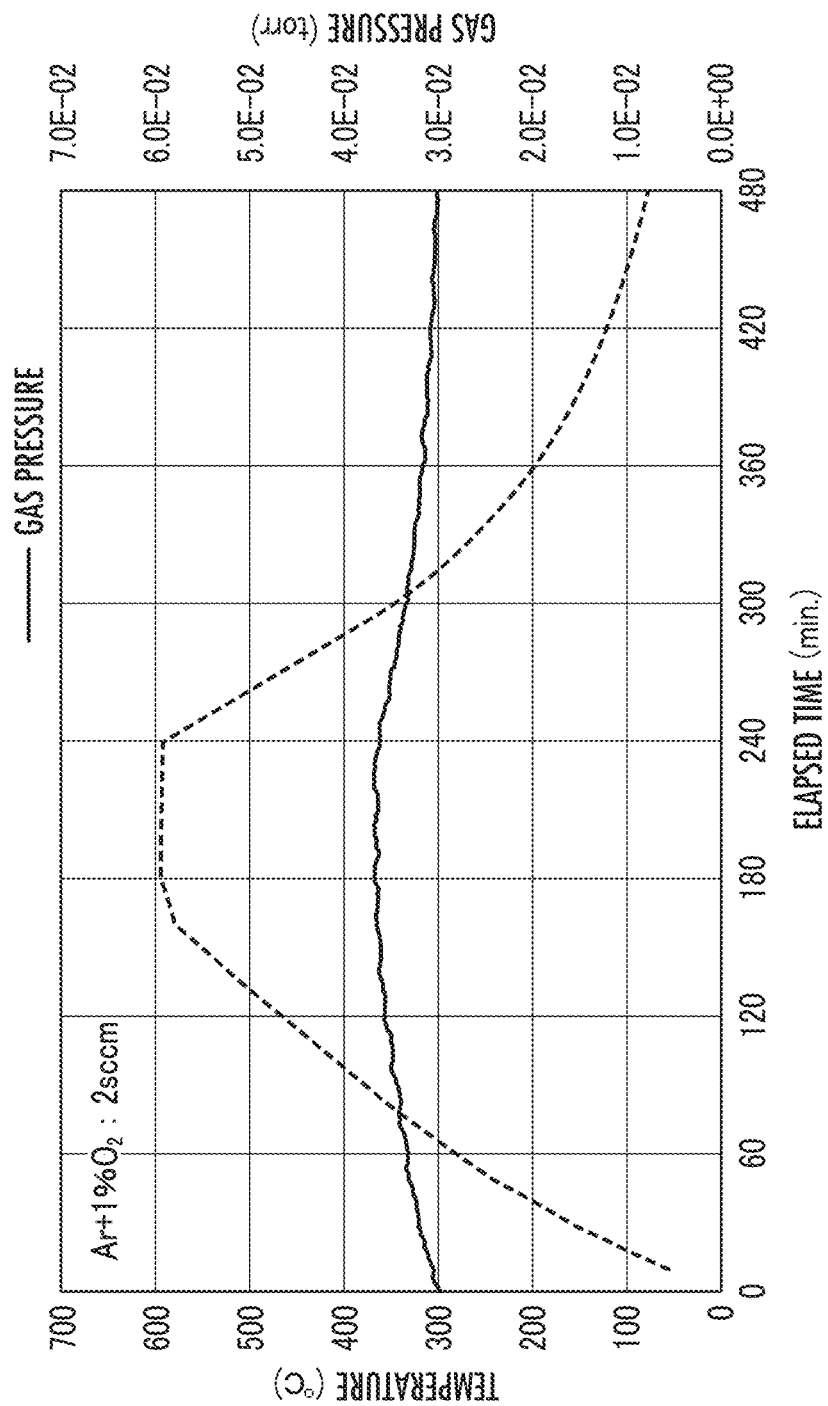
FIG. 2 shows an illustrative view of production conditions for the nanogranular structure material of Example.

As shown by the dashed line in FIG. 2, the sample 1 was gradually heated from about 50° C. to about 600° C. over about 3 hr in a vacuum, heat-treated at about 600° C. for about 1 [hr], and then gradually cooled to about 80° C. over about 4 hr to produce sample 2. The composition of the sample 2 was represented by $Fe_{44}CO_{32}Ba_{13}F_{11}$.

(Sample 3 (Example))

In a mixed gas atmosphere of Ar gas and $O_2$ gas (the partial pressure of $O_2$ gas was about 1% of the mixed gas), the sample 1 was heat-treated in a temperature change manner as shown by the dashed line in FIG. 2 to produce sample 3 as a secondary nanogranular structure material having the composition represented by $Fe_{23}Co_{17}Ba_8F_6O_{46}$. The pressure of the mixed gas of Ar gas and $O_2$ gas was controlled at about 30 mTorr as shown by the solid line in FIG. 2.

Figure 3:
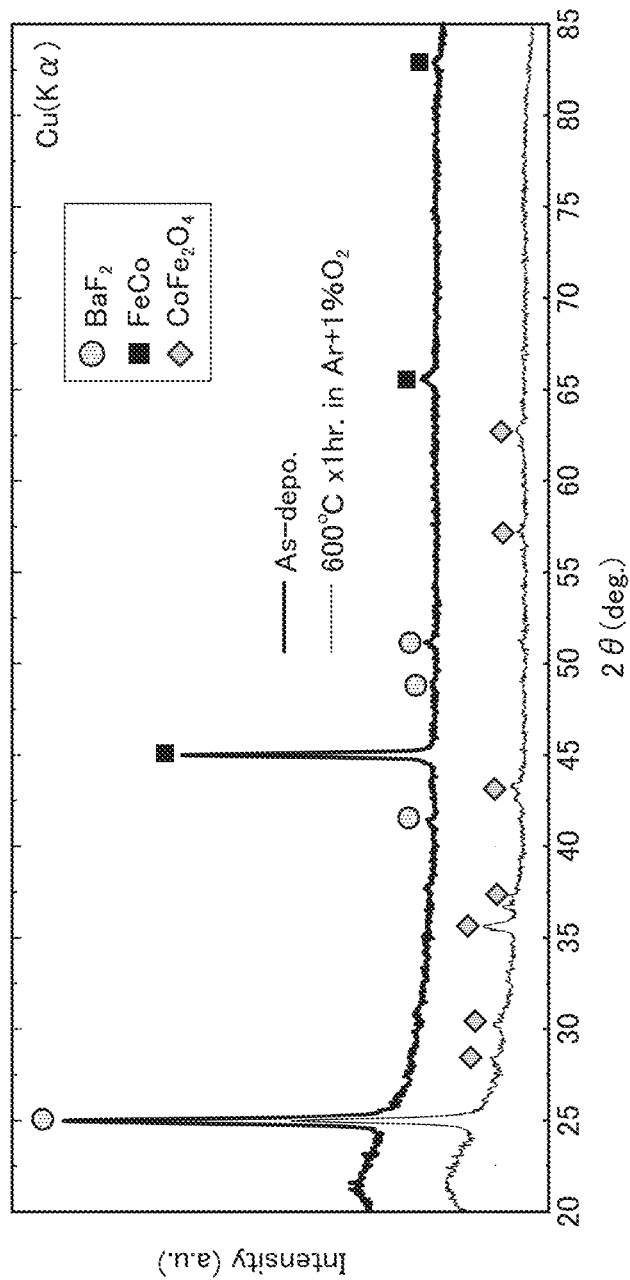
FIG. 3 shows an illustrative view related to the XRD analysis results of each sample of the nanogranular structure material.

The upper part of FIG. 3 shows the XRD analysis result of the sample 1 (primary nanogranular structure material), and the lower part of FIG. 3 shows the XRD analysis result of the sample 3 (secondary nanogranular structure material). It is found from FIG. 3 that the peak derived from Fe and Co that constitute the metal nanoparticles present in the sample 1 does not exist in the sample 3, and instead there is a peak derived from $CoFe_2O_4$ that constitutes the metal oxide nanoparticles. This means that the primary nanogranular structure material is heat-treated in an oxygen-containing atmosphere, whereby the metal nanoparticles contained in the primary nanogranular structure material were oxidized and changed to metal oxide (composite metal oxide) nanoparticles in the secondary nanogranular structure material.

It is found from FIG. 3 that the height of the peak derived from $BaF_2$ constituting the matrix present in the sample 1 is lower in the sample 3. This means that the primary nanogranular structure material is heat-treated in an oxygen-containing atmosphere, whereby the matrix constituting the primary nanogranular structure material is deteriorated and changed into the matrix of the secondary nanogranular structure material.

In FIG. 4, the wavelength dependence of the light transmittance (optical path length of 1 μm) of the sample 1 is shown by a dashed line, and the wavelength dependence of the light transmittance of the sample 3 is shown by a solid line. It is found from FIG. 4 that with respect to light in the wavelength region of 1000 to 1675 nm for optical communication, the light transmittance of the sample 1 is 0.5 to 1.0% (optical path length of 1 μm), whereas the light transmittance of the sample 3 is 58 to 81% (optical path length of 1 μm), which is significantly higher than the sample 1.

FIG. 5 shows the wavelength dependence of the Faraday rotation angle $\theta_F$ of the sample 3 when the magnetic field applied to the sample 3 is 10 kOe. It is found from FIG. 5 that the Faraday rotation angle $\theta_F$ of the sample 3 shows: a tendency to gradually increase as the wavelength increases from $\lambda=400$ nm; a tendency to gradually decrease after showing a maximum value of about 2.5 deg/μm at $\lambda=$about 530 nm; a tendency to gradually decrease after turning from a positive value to a negative value at $\lambda=$about 700 nm; a tendency to gradually increase after showing a minimum value of about −1.5 deg/μm at $\lambda=$about 750 to 800 nm; a tendency to gradually decrease after showing a maximum value of about 0 deg/μm at $\lambda=$about 1300 nm; a tendency to gradually increase after showing a minimum value of about −1.0 deg/μm at $\lambda=$about 1480 nm; and a tendency to gradually increase after turning from a negative value to a positive value at $\lambda=$about 1650 nm.

The absolute value of the Faraday rotation angle of the nanogranular structure material for light in the wavelength region of 500 to 680 and 720 to 1000 nm in the visible light region is within 0.1 deg/μm or more. In addition, the absolute value of the Faraday rotation angle of the nanogranular structure material for light in the wavelength region of 1350 to 1650 nm, which is the optical communication wavelength band, is within the range of 0.1 deg/μm or more.

Table 1 summarizes the heat treatment conditions for each of samples 1 to 3, the Faraday rotation angle, and the light transmittance at a wavelength $\lambda=1550$ nm with an optical path length of 1 μm. It may be noted that samples 4 to 11 shows in Table 1 are prepared by using the method described herein. As shown in Table 1, the nanogranular structure materials of samples 4 to 11 are represented by $Fe_8Co_5Ba_{13}F_{46}O_{28}$, $Fe_{17}Co_{12}Ca_{10}Ba_4F_{18}O_{39}$, $Fe_{10}Co_7Ba_8Ca_7Y_5F_{23}O_{40}$, $Fe_9Co_8Al_{13}Ba_5F_{38}O_{27}$, $Fe_{14}Co_{10}Li_3Mg_{12}F_{25}O_{36}$, $Fe_{12}Co_{10}Ni_5Be_5Ba_{10}F_{22}O_{36}$, $Fe_{16}Co_{11}Ba_9Si_3F_{23}O_{39}$, and $Fe_{19}Co_{15}Ba_{10}Sr_4Bi_4F_{38}O_{10}$, respectively. As discussed hereinabove, sample 3 is represented by $Fe_{23}Co_{17}Ba_8F_6O_{46}$. Thus, for samples 3 to 11, the atomic ratio of L is within a range of 0.13 to 0.40, the atomic ratio of M is within a range of 0.08 to 0.20, the atomic ratio of F is within a range of 0.06 to 0.46, and the atomic ratio of O is within a range of 0.1 to 0.46. Further, for samples 3, 5, 6 and 9, the atomic ratio of L is within a range of 0.17 to 0.40, the atomic ratio of M is within a range of 0.08 to 0.20, the atomic ratio of F is within a range of 0.06 to 0.23, and the atomic ratio of O is within a range of 0.36 to 0.46.

TABLE 1

| | Treatment after deposition | Faraday rotation angle at 1550 nm | Transmittance at 1550 nm |
|---|---|---|---|
| Sample 1 | No (As Depo) | 4 deg./μm | 0.9% |
| Sample 2 | 600° C. × 1 h (in vacuum) | 5.1 deg./μm | 1% |
| Sample 3 | 600° C. × 1 h (Ar + 1%O (30 mTorr)) | −0.9 deg./μm | 80% |
| Sample 4 | $Fe_8Co_5Ba_{13}F_{46}O_{28}$ | −0.13 deg./μm | 80% |
| Sample 5 | $Fe_{17}Co_{12}Ca_{10}Ba_4F_{18}O_{39}$ | −0.72 deg./μm | 74% |
| Sample 6 | $Fe_{10}Co_7Ba_8Ca_7Y_5F_{23}O_{40}$ | −0.50 deg./μm | 70% |
| Sample 7 | $Fe_9Co_8Al_{13}Ba_5F_{38}O_{27}$ | −0.40 deg./μm | 75% |
| Sample 8 | $Fe_{14}Co_{10}Li_3Mg_{12}F_{25}O_{36}$ | −0.75 deg./μm | 47% |
| Sample 9 | $Fe_{12}Co_{10}Ni_5Be_5Ba_{10}F_{22}O_{36}$ | −0.67 deg./μm | 70% |
| Sample 10 | $Fe_{16}Co_{11}Ba_9Si_3F_{23}O_{39}$ | −0.91 deg./μm | 55% |
| Sample 11 | $Fe_{19}Co_{15}Ba_{10}Sr_4Bi_4F_{38}O_{10}$ | −1.0 deg./μm | 41% |

(Application)

Magneto-optical materials having the Faraday effect are often used in optical isolators. The nanogranular structure material according to the present invention is a thin film material with a thickness on the order of submicron, and has a large Faraday effect with a minute size. The use of the present material allows miniaturization and integration of optical isolators, and allows application to optical integrated circuits and the like.

REFERENCE SIGNS LIST

11: Metal oxide nanoparticles, 12: Matrix

The invention claimed is:

1. A nanogranular thin film comprising:
a matrix formed of a fluorine compound having a composition represented by M-F; and
metal oxide nanoparticles dispersed in the matrix and having a composition represented by L-O,
the nanogranular thin film having a composition represented by L-M-F—O,
wherein L is at least one element selected from the group consisting of Fe, Co, and Ni, M is at least one element selected from the group consisting of Li, Be, Mg, Al, Si, Ca, Sr, Ba, Bi, and rare earth elements, F is fluorine, O is oxygen, and an atomic ratio of L is within a range of 0.03 to 0.50, an atomic ratio of M is within a range of 0.03 to 0.30, an atomic ratio of F is within a range of 0.06 to 0.65, and an atomic ratio of O is within a range of 0.04 to 0.50, and
wherein an absolute value of a Faraday rotation angle for light in a wavelength region of 500 to 680 nm is within a range of 0.1 deg/μm or more.

2. The nanogranular thin film according to claim 1, wherein an absolute value of a Faraday rotation angle for light in a wavelength region of 720 to 1000 nm is within a range of 0.1 deg/μm or more.

3. The nanogranular thin film according to claim 1, wherein an absolute value of a Faraday rotation angle for light in a wavelength region of 1350 to 1650 nm is within a range of 0.1 deg/μm or more.

4. The nanogranular thin film according to claim 1, wherein a light transmittance for light in a wavelength region of 1000 to 1675 nm is within a range of 40% at an optical path length of 1 μm.

5. The nanogranular thin film according to claim 1, wherein the atomic ratio of L is within a range of 0.13 to 0.40, the atomic ratio of M is within a range of 0.08 to 0.20, the atomic ratio of F is within a range of 0.06 to 0.46, and the atomic ratio of O is within a range of 0.1 to 0.46.

6. The nanogranular thin film according to claim 1, wherein the atomic ratio of L is within a range of 0.17 to 0.40, the atomic ratio of M is within a range of 0.08 to 0.20, the atomic ratio of F is within a range of 0.06 to 0.23, and the atomic ratio of O is within a range of 0.36 to 0.46.

7. A method for producing a nanogranular thin film, comprising a step of heat-treating, in a temperature range of 300 to 800° C. in an oxygen-containing atmosphere, a primary nanogranular structure material comprising a matrix having a composition represented by M-F and metal nanoparticles dispersed in the matrix and having a composition represented by L to provide the nanogranular thin film according to claim 1 as a secondary nanogranular thin film.

* * * * *